Feb. 17, 1970 D. G. PAINTER, SR 3,496,515
SOLDERLESS MECHANICAL CIRCUIT BOARD CONNECTOR
Filed Dec. 28, 1967
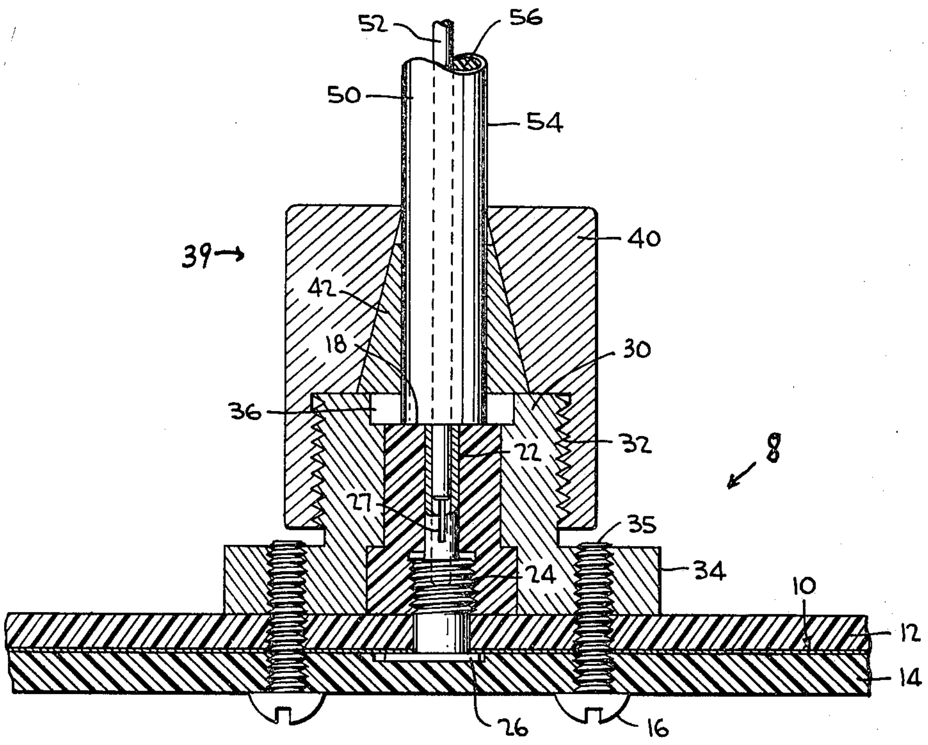
INVENTOR,
DAVID G. PAINTER, SR.
BY Harry M. Saragovitz
Edward J. Kelly Herbert Berl
& Gerald J. Lett
ATTORNEYS

United States Patent Office 3,496,515
Patented Feb. 17, 1970

3,496,515

SOLDERLESS MECHANICAL CIRCUIT BOARD CONNECTOR

David G. Painter, Sr., Alexandria, Va., assignor to the United States of America as represented by the Secretary of the Army Filed Dec. 28, 1967, Ser. No. 694,187
Int. Cl. H05k *1/10*
U.S. Cl. 339—17 4 Claims

ABSTRACT OF THE DISCLOSURE

A solderless mechanical connector assembly to connect the printed circuitry on a chemically etched circuit board to a coaxial cable. The connector is a three piece mechanical device comprising a center conductor which makes electrical contact with the circuitry on the board, an insulator and a metal outer body that has a flanged end which is mounted on the circuit board.

The invention described herein may be manufactured, used and licensed by or for the Government for governmental purposes without the payment to me of any royalty thereon.

Background of the invention

The use of chemically etched circuit boards or printed circuits has greatly increased in recent years. When these circuit boards are utilized in certain types of electronic circuitry, it becomes necessary at times to have a connection between a conductor on the circuit board and a coaxial cable. A coaxial cable is one in which one conductor completely surrounds the other, the two conductors being separated by a continuous dielectric. These cables are used because they have the advantage of not producing an external electromagnetic field and will not be susceptible to external fields from other sources. Because of these characteristics, the cables are extensively used for radio-frequency transmission lines and are installed as multichannel telephone carrier and television program lines.

Chemically etched circuit boards are most commonly made by coating the board with a thin layer of metal such as aluminum or copper which is then etched by a chemical process to remove part of the metal leaving enough on the board to define the circuitry desired. Because of the thinness of the aluminum and its low melting point, it is especially difficult to fasten the center conductor of a coaxial cable to the printed aluminum circuitry by a connection that is electrically sound and mechanically strong. Previous methods attempting to fasten the conductors have been tried by ultrasonic bonding, resistance welding and laser beam welding or soldering. None of the previous methods have been successful, mainly because of the disintegration of the metal fail under the heat of the coaxial conductor.

It is therefore an object of this invention to provide a solderless mechanical connector for connecting a coaxial cable to a chemically etched circuit board.

An additional object of this invention is to provide a solderless mechanical connector for connecting a coaxial cable to a chemically etched circuit board which results in a strong connection and takes up little space.

Still another object of this invention is to provide a solderless mechanical connector for connecting a coaxial cable to a chemically etched circuit board that is inexpensive and will require a minimum of cable and circuit board preparation.

Summary of the invention

The solderless mechanical connector of my invention is a three piece mechanical device comprising a center conductor, an insulator, and a metal flanged outer body. The center conductor makes contact with the etched metal and then passes through the circuit board to project from the surface of the board. The insulator is fitted over the projecting center conductor and the flanged body is placed over the insulator and attached to the circuit board. The flanged outer body has a threaded outer diameter allowing the connection of a standard coaxial cable to the connector.

Brief description of the drawings

The specific nature of the invention, as well as other objects, aspects, uses and advantages thereof, will clearly appear from the following description and from the accompanying drawings, in which:

FIGURE 1 is a cross-sectional view of a solderless mechanical circuit board connector in accordance with my invention.

Description of the preferred embodiment

In the drawing, the solderless mechanical connector 8 is attached to the chemically etched aluminum layer 10 which is plated on circuit board 12. The connector comprises a center conductor 22, a Teflon dielectric 18 which is used as an electrical insulator, and a flanged outer body 30. The center conductor 22 is cylindrically shaped and has one end 26 flattened with an increased diameter so as to enable it to make electrical contact with the aluminum 10. The other end of the center conductor 22 is a collet type of receptacle 27 for the inner conductor of the coaxial cable which fits into it. The middle part of the center conductor 22 is threaded at 24. The Teflon dielectric insulator 18 has a tapped hole and is threaded so as to screw onto the protruding end of the center conductor 22 and engage thread 24. The flanged outer body 30 is made of metal and has an inner bore shaped to fit over the insulator 18. One end of the body 30 has a flange 34 in which a plurality of tapped holes 35 are drilled so as to enable the body to be fastened to the circuit boards. The other end of the body 30 has a threaded outer diameter designed to accommodate the nut 40 from coaxial cable connector.

When using the connector of my invention, the center conductor 22 is inserted through a hole in the conductor 10 and the circuit board 12 so that the flattened end 26 of the center conductor 22 rests against the aluminum layer 10 with its other end protruding from the unplated end of circuit board 12. Insulator 18 is then screwed onto the protruding end of the center conductor and tightened so that the center conductor is held firmly. The flanged body 30 is then placed over the insulator. Hold down screws 16 are inserted into the tapped holes 35 in the flange of body 30 through the circuit boards 12 and 14 so as to fasten the body 30 to the circuit board. Circuit board 14 may be uncoated or have a matching etched surface with a metal conductor making contact with the bottom of the flattened end 26. Using a sandwich design for the circuit boards gives the advantage of minimizing the possibility of shorting the connectors and protects the etched metal surface from damage.

A coaxial cable 50, not part of the present invention, is attached to the connector assembly 8 by attaching means 39 which is likewise not part of the present invention. Attaching means 39 is described in more detail in copending application Ser. No. 676,389, filed Oct. 17, 1967, entitled Solderless Mechanical Coaxial Cable Connector. The cable 50 has an inner conductor 52 and an outer conductor 54, the two conductors being separated by an insulator 56 disposed between them. The outer conductor and the insulation are stripped back approximately 3/16 of an inch so that the inner conductor protrudes slightly from the end of the cable and may be inserted within the collet type receptacle 27 of center conductor 22 of the connector assembly. The cable is firmly attached to the connector assembly by engaging the nut 40 with the thread 32 on the flanged body 30. The nut 40 is fitted over a tapered collet type ferrule 42 and when the nut is tightened the ferrule 42 will firmly grasp the outer conductor 54 of the cable.

It will be apparent that the embodiments shown are only exemplary and that various modifications can be made in construction and arrangement within the scope of the invention.

I claim as my invention:

1. A solderless mechanical connector for connecting a chemically etched circuit board with a coaxial cable, comprising:

(a) a cylindrical conductor adapted to be passed through said circuit board, said conductor having a first end which is flattened and elongated for providing good contact with one side of said circuit board, a center portion which is partially threaded, and a second end having means to make electrical contact with the inner conductor of said coaxial cable;

(b) a cylindrical insulator having a bore at its center fitted over said cylindrical conductor and being internally threaded, thereby engaging the threaded portion of said cylindrical conductor;

(c) a flanged outer cylindrical conductor fitted over said insulator;

(d) means for securing said outer cylinderical conductor to said circuit board; and (e) means for providing electrical contact between said outer cylindrical conductor and the outer conductor of said coaxial cable.

2. The device of claim 1 wherein said means to make electrical contact with the inner conductor of a coaxial cable comprises a collet-type receptacle adapted to receive the inner conductor of said coaxial cable.

3. The device of claim 1 wherein said means for providing electrical contact between said outer cylindrical conductor and the outer conductor of said coaxial cable comprises a tapered ferrule.

4. The device of claim 3 further comprising a nut adapted to fit over said tapered ferrule and to be threadedly engaged with said outer cylindrical conductor.

References Cited

UNITED STATES PATENTS

| | | | |
|---|---|---|---|
| 753,276 | 3/1904 | Kimbark | 339—177 XR |
| 2,048,891 | 7/1936 | Rabezzana | 339—26 XR |
| 2,839,595 | 6/1958 | Felts et al. | 339—177 XR |
| 3,201,722 | 8/1965 | May et al. | 339—17 XR |

MARVIN A. CHAMPION, Primary Examiner

P. A. CLIFFORD, Assistant Examiner

U.S. Cl. X.R.

333—84; 339—177